United States Patent
Shinbata

(10) Patent No.: US 7,400,778 B2
(45) Date of Patent: Jul. 15, 2008

(54) DIAGNOSIS SUPPORT APPARATUS AND IMAGE PROCESSING METHOD

(75) Inventor: Hiroyuki Shinbata, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 743 days.

(21) Appl. No.: 10/830,169

(22) Filed: Apr. 22, 2004

(65) Prior Publication Data

US 2004/0223634 A1 Nov. 11, 2004

(30) Foreign Application Priority Data

May 7, 2003 (JP) .............................. 2003-129451

(51) Int. Cl.
G06K 9/40 (2006.01)
(52) U.S. Cl. ........................................ 382/260; 358/75
(58) Field of Classification Search .................. 382/260
See application file for complete search history.

(56) References Cited

U.S. PATENT DOCUMENTS

| 4,769,850 | A | * | 9/1988 | Itoh et al. .................... 382/132 |
| 4,907,156 | A | | 3/1990 | Doi et al. |
| 6,094,508 | A | * | 7/2000 | Acharya et al. ............. 382/199 |
| 6,418,238 | B1 | * | 7/2002 | Shiratani et al. ............. 382/133 |
| 2002/0062075 | A1 | * | 5/2002 | Takeo ......................... 600/407 |

FOREIGN PATENT DOCUMENTS

JP 2571132 10/1996

OTHER PUBLICATIONS

Nakayama, Masato, et al., *Study On Automatic Lung Cancer Lesion Recognition Using 3D Morphological Filter*, Proceedings of Japanese Society of Medical Imaging Technology, vol. 13, No. 2, pp. 155-164 (1995), w/English translation of relevant portion thereof.

* cited by examiner

*Primary Examiner*—Matthew C. Bella
*Assistant Examiner*—Aklilu K Woldemariam
(74) *Attorney, Agent, or Firm*—Morgan & Finnegan, LLP

(57) ABSTRACT

An image processing method of processing an image for diagnosis support enhances a circular shadow existing in an image by enhancing the pixel value gradient of the circular image, and extracts an isolated shadow from the enhanced image.

6 Claims, 6 Drawing Sheets

DIAGNOSIS SUPPORT APPARATUS AND IMAGE PROCESSING METHOD

FIELD OF THE INVENTION

The present invention relates to a diagnosis support apparatus and an image processing method and, more particularly, to a diagnosis support method and apparatus which automatically extract an isolated shadow such as a tumor shadow from an image.

BACKGROUND OF THE INVENTION

With recent advances in digital technology, a radiographic image is transformed into a digital image signal, which is displayed on a CRT or the like or printed out upon being subjected to image processing. In addition, recently, a diagnosis support apparatus which automatically extracts a tumor shadow or the like from a radiographic image has been developed. An image containing the tumor shadow or the like extracted by the diagnosis support apparatus is often displayed on a film or CRT.

Such methods of automatically extracting isolated shadows include, for example, the isolated shadow extraction method disclosed in U.S. Pat. No. 4,907,156. This method will be described briefly. A differential image between a tumor shadow enhanced image and a tumor shadow suppressed image is generated. Multiple threshold processing is performed for the generated differential image, and known labeling processing is simultaneously performed, thereby calculating a feature amount such as a roundness from an isolated shadow having a value that is equal to or larger than a predetermined threshold and extracting an isolated shadow on the basis of the feature amount at the same time.

As another method of automatically extracting isolated shadows, the following extraction method is disclosed in Japanese Patent No. 2,571,132. A component of a normalized gradient $\nabla fij/|\nabla fij|$ of image data fij of each pixel Pij (i=1, 2, ..., 8; j=1, 2, 3) in the direction of a line segment Li is obtained by $\nabla fij/|\nabla fij|*ei$ (where ei represents a unit vector extending from each pixel Pij to a predetermined pixel P0, and * represents the inner product). (Note that the unit vectors ei are those extending from the pixel P0 in eight directions including horizontal directions, vertical directions, and 45° directions.)

Then, assuming that the inward direction (the direction toward the predetermined pixel P0) of the component is positive, and the outward direction is negative, the maximum value of each line segment Li (i=1, 2, ..., 8) is obtained as follows:

$$\{\nabla fij/|\nabla fij|*ei\}_M (i=1, 2, ..., 8)$$

In addition, the sum of these maximum values $\{\nabla fij/|\nabla fij|*ei\}_M$ is obtained. This sum is compared as a feature value C2 with a predetermined threshold Th2. Depending on whether C2≧Th2 or C2<Th2, it is determined whether or not the predetermined pixel P0 is a pixel in each tumor shadow. In addition, a quoit like morphological filter used to extract an isolated shadow is described in "Study on Automatic Lung Cancer Lesion Recognition Using 3D Morphological Filter" (Masato Nakayama et al., Proceedings of Japanese Society of Medical Imaging Technology 95, pp. 155-16 (1995). This technique uses a Q filter expressed by a combination of a D filter (Disk Filter) having a radius ri and an R filter (Ring Filter) having inner radii r2 and r3. This transform is called Q transform. More specifically, Q transform is the processing of subtracting the pixel value obtained after Dilation using the R filter from the pixel value obtained after Dilation using the D filter. The processing of performing Q transform of an image after Q transform will be referred to as inverse Q transform. The relationship between Q transform and inverse Q transform is similar to that between Fourier transform and inverse Fourier transform. This is because, Q transform can be regarded as a process of extracting a Q filter component in an image, and inverse Q transform can be regarded as a process of inversely transforming the extracted component to express it in the original image space.

The following is the definition expression of the Q filter. If the D filter (Disk Filter) D(x, y) and R filter (Ring Filter) R(x, y) are represented by $$D(x, y)=0: \text{ for } x^2+y^2 \leq r_1^2$$
$$-\infty: \text{ for others} \qquad (1)$$

$$R(x, y)=0: \text{ for } r_2^2 \leq x^2+y^2 \leq r_3^2$$
$$-\infty: \text{ for others} \qquad (2)$$

then, Q transform is represented by $$G(x, y)=f(x, y)\Theta D(x, y)-f(x, y)\Theta R(x, y) \qquad (3)$$

where $\Theta$ represents Dilation. When an original image is represented by f(x, y), and a filter function is given by h(x, y), then $$f(x, y)\Theta h(x, y)=\max\{f(x+x1, y+y1)+h(x1, y1) \mid (x1, y1)\in K\} \qquad (4)$$

where K is the domain of the filter function.

According to the inventions disclosed in U.S. Pat. No. 4,907,156 and Japanese Patent No. 2,571,132, isolated shadows can be enhanced. However, for example, in a chest image, images of regions other than an isolated shadow, e.g., edge portions such as a vomer shadow, are also enhanced. Consequently, not all regions with pixel values equal to or more than a predetermined value on an image after enhancement do indicate isolated shadow regions. In order to extract only an isolated shadow, therefore, some kind of feature extraction processing must be done with respect to an enhanced image.

In such processing, when a vomer shadow and tumor shadow are located near each other or they overlap, it is difficult to separate the tumor shadow from the vomer shadow, resulting in a deterioration in tumor extraction precision. In the invention disclosed in Japanese Patent No. 2,571,132, in particular, if the pixel value gradient of an entire region in which a tumor exists is stronger than that of a tumor shadow, a normalized vector representing the tumor shadow cannot be properly calculated, resulting in a deterioration in tumor shadow extraction precision. This raises a problem in extracting a tumor shadow existing near the periphery of the lung field from, for example, a chest frontal image.

When a quoit-like morphological filter disclosed in "Study on Automatic Lung Cancer Lesion Recognition Using 3D Morphological Filter" is used, only an isolated shadow can be extracted. Therefore, feature amount extraction processing and the like need not be performed for isolated shadow extraction. In addition, even if a vomer shadow and tumor shadow overlap, only the tumor shadow can be extracted.

In practice, however, tumor shadows rarely exist in a bulging state, and tumor portions generally blend as images with surrounding images like stains. For this reason, a quoit-like morphological filter is not suited for the extraction of an actual tumor shadow existing in, for example, a chest image. This is because a quoit-like morphological filter works well only when a tumor shadow bulges from surrounding images. This raises a problem in extracting a tumor shadow existing near the periphery of the lung field in, for example, a chest frontal image.

SUMMARY OF THE INVENTION

The present invention has been made to solve the above problems, and has as its object to properly extract an isolated shadow such as a tumor shadow.

It is another object of the present invention to develop a diagnosis support apparatus which can extract an isolated shadow such as tumor shadow even if it overlaps a vomer shadow or is located at the periphery of the lung field.

In order to solve the above objects, a diagnosis support apparatus according to the present invention has the following arrangement. That is, there is provided a diagnosis support apparatus which supports diagnosis by processing an image, comprising: an enhancement unit configured to enhance a circular shadow existing in an image by enhancing a pixel value gradient of the circular shadow; and an extraction unit configured to extract an isolated shadow from the image enhanced by the enhancement unit.

In addition, in order to solve the above problems, a diagnosis support method according to the present invention processes an image for diagnosis support, and comprises: an enhancement step of enhancing a circular shadow existing in an image by enhancing a pixel value gradient of the circular shadow; and an extraction step of extracting an isolated shadow from the image enhanced in the enhancement step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
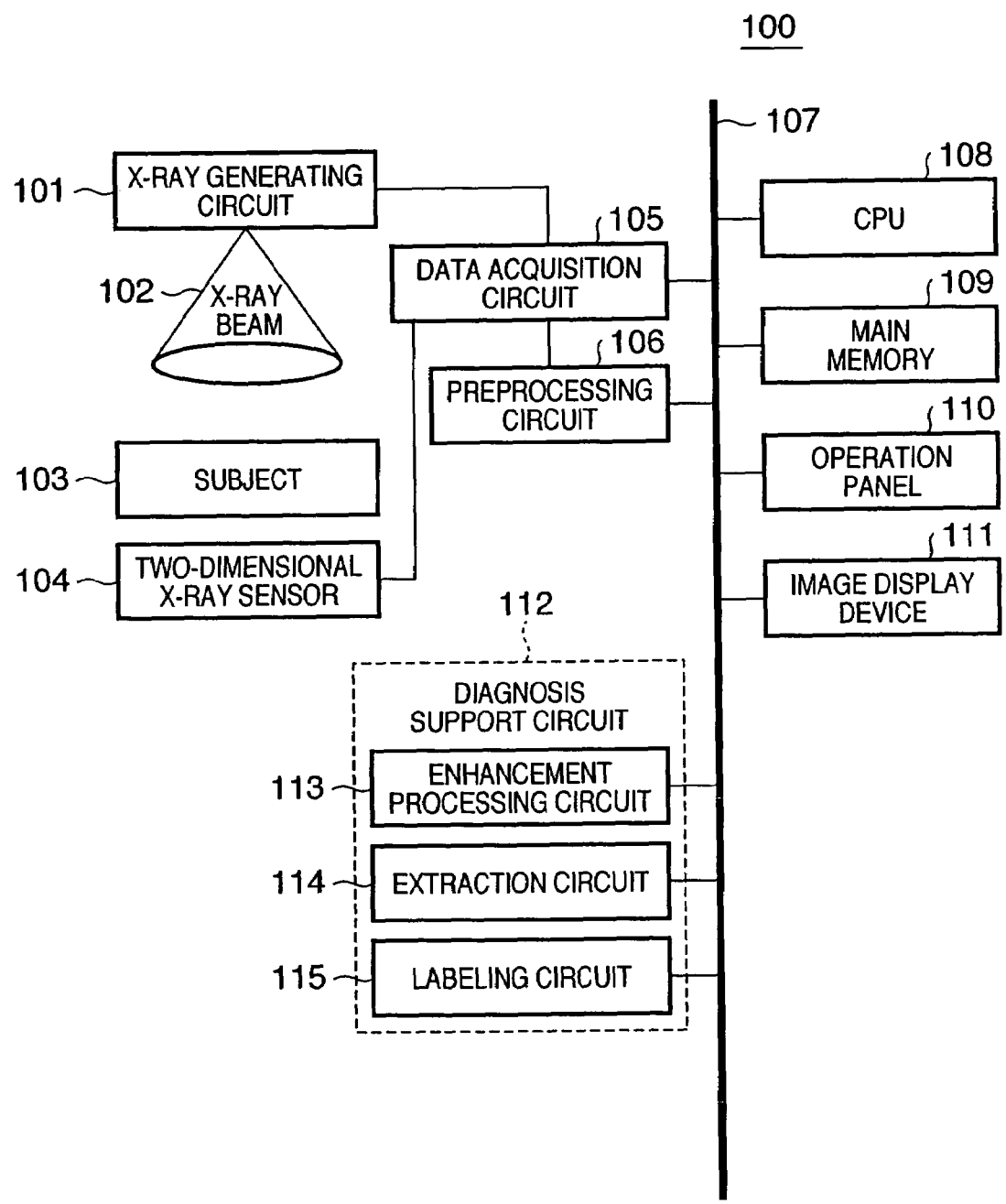
FIG. 1 is a block diagram showing the arrangement of X-ray imaging device according to the first embodiment.

FIG. 1 is a block diagram showing the arrangement of X-ray imaging device 100 according to the first embodiment. As shown in FIG. 1, the X-ray imaging device 100 has a diagnosis support function, and includes a preprocessing circuit 106, CPU 108, main memory 109, operation panel 110, image display device 111, and diagnosis support circuit 112. These components exchange data through a CPU bus 107.

In the diagnosis support circuit 112, an enhancement processing circuit 113 enhances a circular shadow such as a tumor shadow contained in an image to form a bulging shadow. An extraction circuit 114 extracts a bulging shadow from the image in which the circular shadow is enhanced by the enhancement processing circuit 113. A labeling circuit 115 labels the extracted region by performing known labeling processing with respect to the image processed by the extraction circuit 114.

The X-ray imaging device 100 also includes a data acquisition circuit 105 connected to the preprocessing circuit 106, and a two-dimensional X-ray sensor 104 and X-ray generating circuit 101 which are connected to the data acquisition circuit 105. These circuits are also connected to the CPU bus 107.

In the above X-ray imaging device 100, the main memory 109 stores various data required for processing in the CPU 108 and the like, and includes a work memory for operation by the CPU 108. For example, the CPU 108 controls the operation of the overall apparatus by using the main memory 109 in accordance with the operation instructions input from the operation panel 110. With this control, the X-ray imaging device 100 operates as follows.

First of all, the X-ray generating circuit 101 emits an X-ray beam 102 to a subject 103 to be examined. The X-ray beam 102 emitted from the X-ray generating circuit 101 is transmitted through the subject 103 while being attenuated, reaches the two-dimensional X-ray sensor 104, and is output as an X-ray image from the two-dimensional X-ray sensor 104. Assume that in this case, the X-ray image output from the two-dimensional X-ray sensor 104 is a chest frontal image.

The data acquisition circuit 105 converts the X-ray image output from the two-dimensional X-ray sensor 104 into an electrical signal and supplies it to the preprocessing circuit 106. The preprocessing circuit 106 performs preprocessing such as offset correction processing or gain correction processing with respect to the signal (X-ray image signal) from the data acquisition circuit 105. The X-ray image signal having undergone the preprocessing in the preprocessing circuit 106 is transferred as an original image to the main memory 109 and diagnosis support circuit 112 through the CPU bus 107 under the control of the CPU 108.

Figure 2:
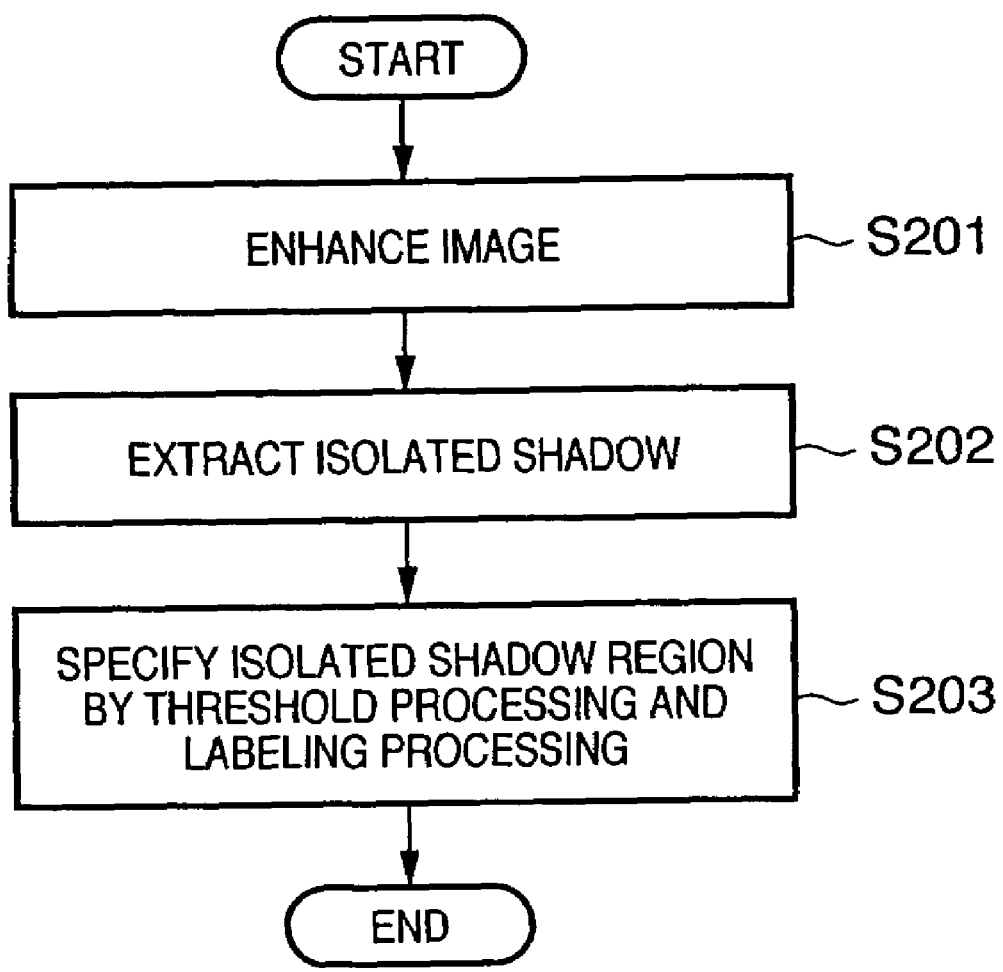
FIG. 2 is a flow chart showing the flow of processing in a diagnosis support circuit 112 in the X-ray imaging device according to the first embodiment.
Figure 3:
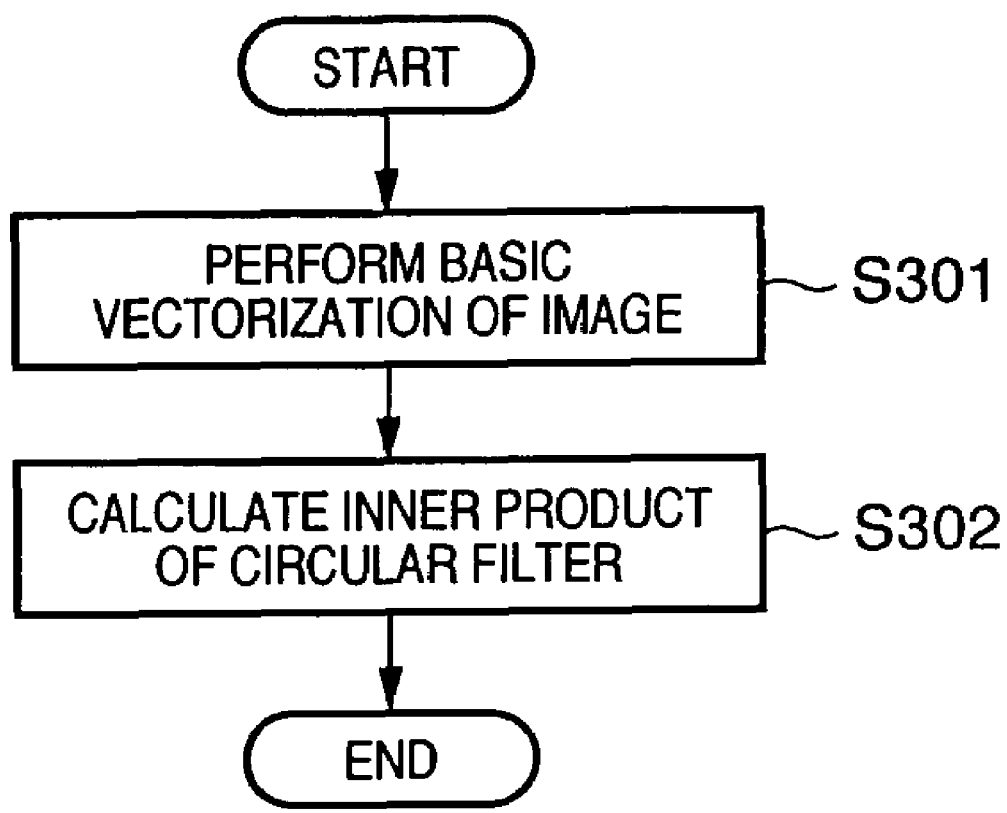
FIG. 3 is a flow chart showing the flow of processing in an enhancement processing circuit 113 in the X-ray imaging device according to the first embodiment.
Figure 4:
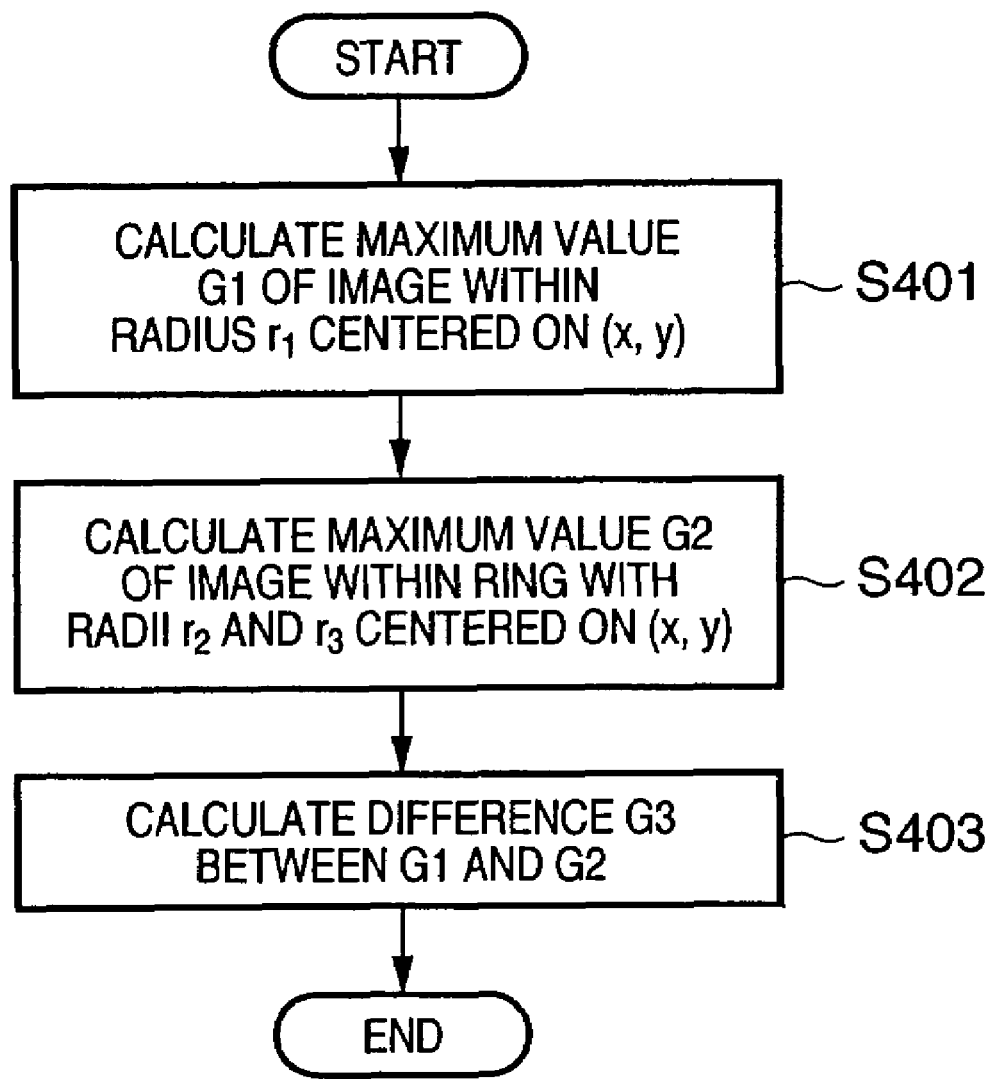
FIG. 4 is a flow chart showing the flow of processing in an extraction circuit 114 in the X-ray imaging device according to the first embodiment.

FIG. 2 is a flow chart showing the flow of processing in the diagnosis support circuit 112 according to the first embodiment. FIGS. 3 and 4 are flow charts showing the flows of processing in the enhancement processing circuit 113 and extraction circuit 114, respectively. The processing performed by the diagnosis support circuit 112 will be described below with reference to these flow charts.

First of all, the enhancement processing circuit 113 causes a circular shadow to bulge from a surrounding image region by enhancing the circular shadow, and performs the processing of suppressing the overall pixel value gradient of an original image (step S201). This processing is important in improving the isolated shadow extraction precision in step S202. In this case, "the processing of suppressing the overall pixel value gradient" is equivalent to suppressing the overall pixel value gradient of the image as a result of enhancement processing. For this reason, the gradient of the periphery of the lung field is also suppressed. However, the gradient of the periphery of the lung field is not suppressed in a form suitable for the extraction of a tumor shadow.

Any kind of enhancement processing can be used as long as it enhances a circular shadow. In this embodiment, the following processing is performed. Let f(x, y) be a pixel value at coordinates (x, y) on an original image. A normalized gradient "$\nabla fij/|\nabla fij|$" (basic vector) of each pixel f(i, j) having vector component $x(i, j)=f(i+d, j)-f(i, j)$ in the x direction and vector component $y(i, j)=f(i, j+d)-f(i, j)$ in the y direction is calculated throughout the original image (step S301 in FIG. 3). Letting $\nabla fij/|\nabla fij|$ be the normalized gradient of image data fij of each pixel f(i, j) on a circle having radius r and a center point with the coordinates (x, y) on the original image, and letting e(i, j) be a unit vector extending from the coordinates (x, y) to a point f(i, j) on the circle, $\nabla fij/|\nabla fij|*e(i, j)$ (where * represents the inner product) is obtained (step S302).

Then, assuming that the inward direction of the component is positive, and the outward direction is negative, the sum of $\{\nabla fij/|\nabla fij|*ei\}$ is obtained (step S302).

This sum is set as a pixel value at coordinates (x, y) after enhancement processing. In general, a tumor shadow is a circular shadow, and is obtained as image data in the form in which the peripheral portion of the circular shadow permeates in a surrounding image. Therefore, the inner product of a pixel value gradient on a circle adjusted to the radius of the circular shadow and a unit vector extending from the center point of the circle to a point on the circle becomes a large value when the center point of the circle almost overlaps the center point of the tumor shadow. As a consequence, the image after the processing becomes an image with a bulge centered on the center point of the circular shadow (a circular shadow with a large pixel value gradient centered on the center point of the circular shadow).

The extraction circuit 114 extracts an isolated shadow from the image enhanced by the enhancement processing circuit 113 (step S202).

The following is an example of a specific sequence for extraction processing. The following sequence is based on the technique disclosed in "Study on Automatic Lung Cancer Lesion Recognition Using 3D Morphological Filter", and extraction processing using a morphological filter.

First of all, the D filter (Disk Filter) D(x, y) and R filter (Ring Filter) R(x, y) are defined as follows:

$$D(x, y)=0: \text{for } x^2+y^2 \leq r_1^2$$

$$-\infty: \text{for others} \quad (1)$$

$$R(x, y)=0: \text{for } r_2^2 \leq x^2+y^2 \leq r_3^2$$

$$-\infty: \text{for others} \quad (2)$$

A maximum value G1(x, y) within a radius $r_1$ centered on the coordinates (x, y) on the original image is calculated (step S401) according to:

$$G1(x, y)=f(x, y) \Theta D(x, y) \quad (3)$$

A maximum value G2(x, y) within a ring with radii $r_2$ and $r_3$ centered on the coordinates (x, y) on the original image is calculated (step S402) according to:

$$G2(x, y)=f(x, y) \Theta R(x, y) \quad (4)$$

In this case, the radii $r_1$, $r_2$, and $r_3$ may be determined on the basis of experiments. If, for example, a tumor shadow to be obtained has a size of 15 mm, it suffices, according to experiments, if $r_1=r_2=$about 8 mm, and $r_3=$about 9 mm.

The difference between maximum values (the difference between G1 and G2) is calculated (step S403) according to:

$$G3(x, y)=G1(x, y)-G2(x, y) \quad (5)$$

If $\Theta$ represents Dilation and the original image and filter function are represented by f(x, y) and h(x, y), respectively, in equations (3) and (4), then $$f(x, y) \Theta h(x, y)=\max\{f(x+x1, y+y1)+h(x1, y1) \mid (x1, y1) \in K\} \quad (6)$$

where K is the domain of the filter function. In this case, D(x, y) and R(x, y) correspond to the domains K in equations (3) and (4), respectively.

In the image G3(x, y) obtained in the above manner, an isolated shadow in the enhanced image is the extracted image. That is, a range of a predetermined pixel value or more of G3(x, y) is an image region existing in the isolated shadow. An isolated shadow region can therefore be labeled by assigning 1 to a pixel value in an image region within a predetermined pixel value range and assigning 0 to a pixel value in other ranges, and performing general labeling processing with respect to the region of image having pixel value 1 (step S203). That is, the region labeled in step S203 is an isolated shadow region, and is highly likely to be a tumor shadow.

As described above, by using the isolated shadow extraction method according to the first embodiment, a shadow permeating in a surrounding image like an actual tumor shadow can be extracted more reliably. In addition, an image region of a processed image which exhibits a value equal to or more than a predetermined threshold always falls within an isolated shadow. Furthermore, labeling processing makes it possible to accurately calculate the region even if a plurality of isolated shadow regions exist.

Second Embodiment

In the second embodiment, a high-frequency image is obtained from an original image, and the obtained high-frequency image is processed in the same manner as in the first embodiment.

Figure 5:
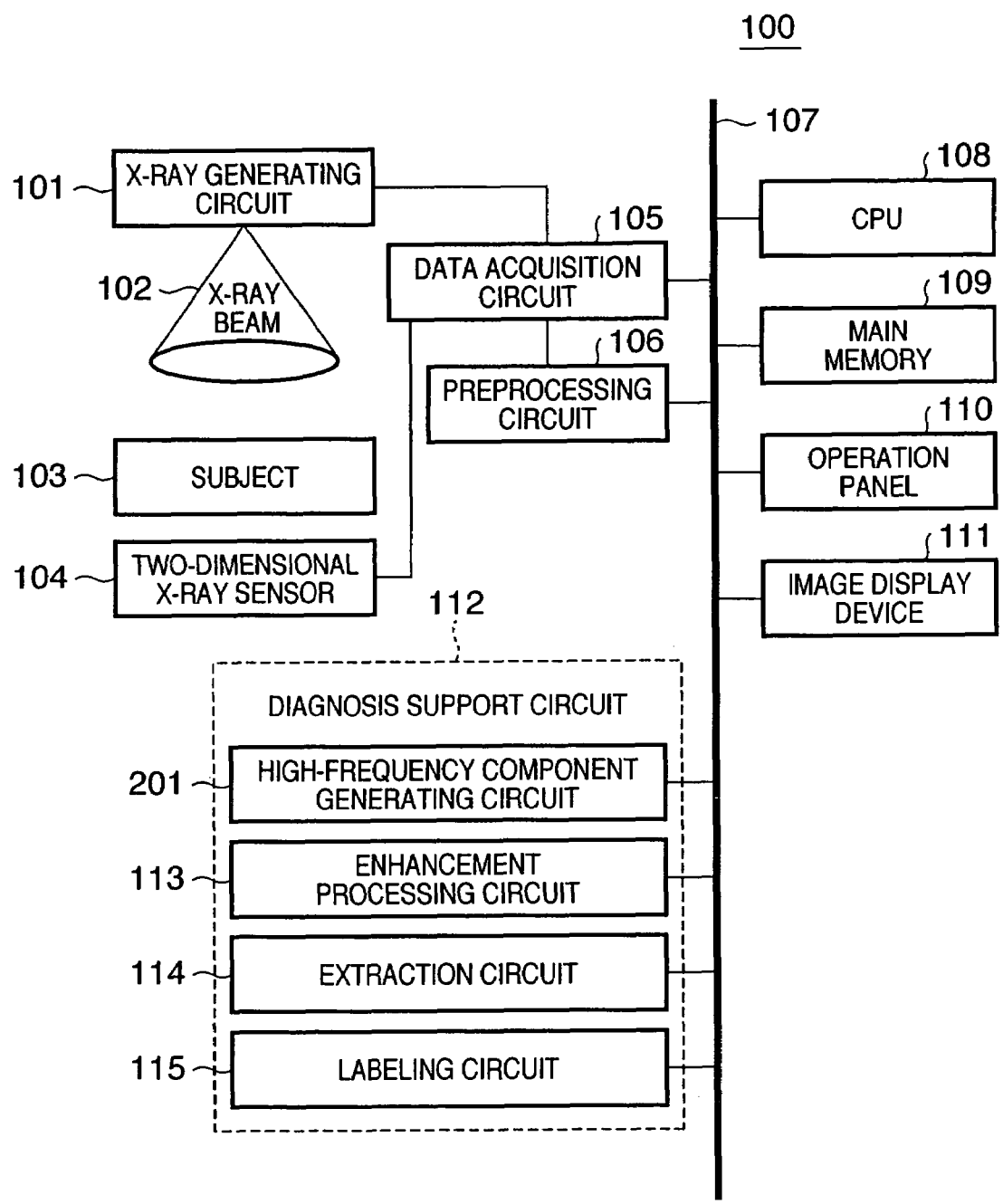
FIG. 5 is a block diagram showing the arrangement of X-ray imaging device according to the second embodiment.

FIG. 5 is a block diagram showing the arrangement of X-ray imaging device. As shown in FIG. 5, a high-frequency component generating circuit 201 is added to the arrangement of the X-ray imaging device according to the first embodiment (FIG. 1). The high-frequency component generating circuit 201 generates a high-frequency component of an original image. The operation of the X-ray imaging device according to the second embodiment will be described below with reference to the flow chart of FIG. 6.

Figure 6:
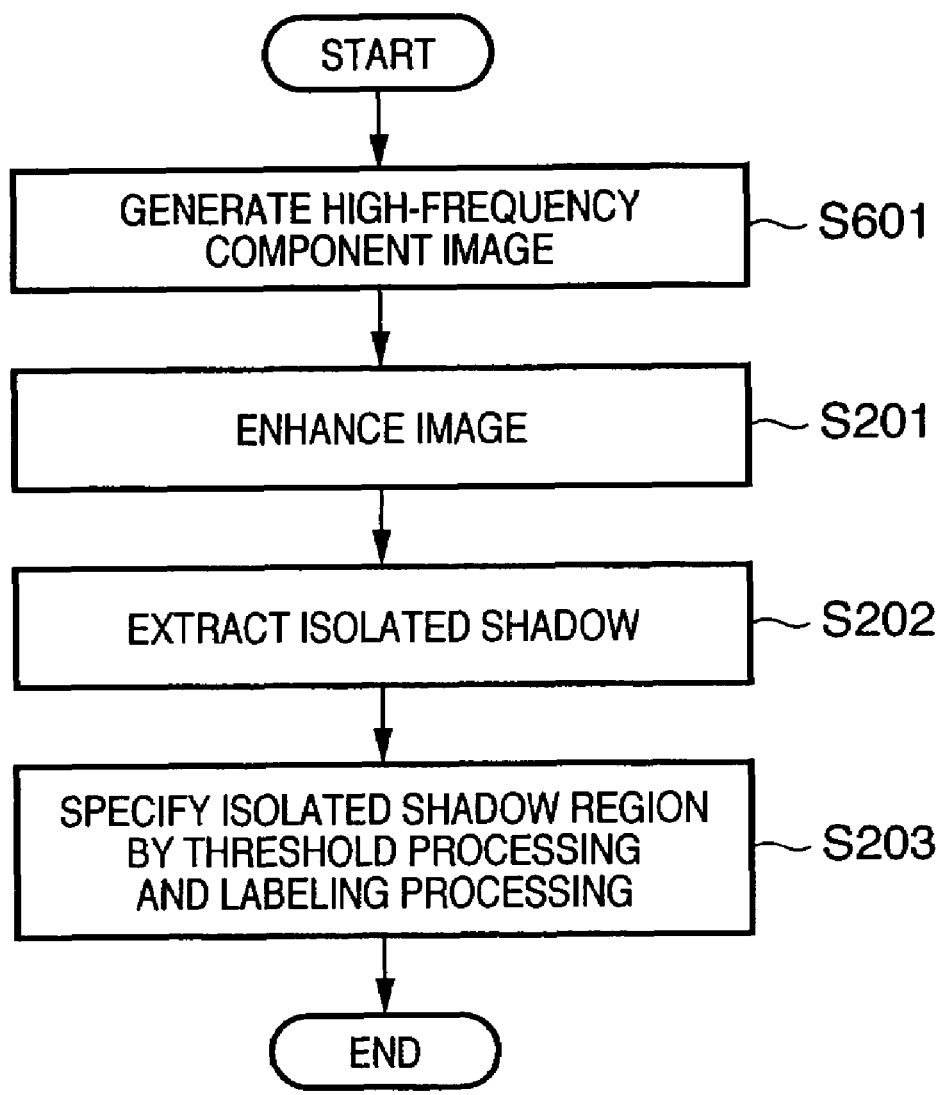
FIG. 6 is a flow chart showing the flow of processing in a diagnosis support circuit 112 in the X-ray imaging device according to the second embodiment.

FIG. 6 is a flow chart showing the flow of isolated shadow extraction processing according to the second embodiment. Referring to FIG. 6, the same step numbers as in the first embodiment (FIG. 2) denote the same processing, and a description thereof will be omitted.

The high-frequency component generating circuit 201 generates a high-frequency component image Sus(x, y) (step S601) according to:

$$Sus(x, y) = \frac{\int_{-d1}^{d1}\int_{-d2}^{d2} f(x+x1 \cdot y + y1) dx1\, dy1}{\int_{-d1}^{d1}\int_{-d2}^{d2} dx1\, dy1} \qquad (7)$$

Then, the same processing as the above described first embodiment is applied to the image Sus(x,y).

According to the first embodiment, when the gradient of a background image is large as in the case of the periphery of the lung field of a chest frontal image, a normalized gradient may not be accurately obtained. This is because when the gradient of a background is large, the gradient of the background image influences the direction of a normalized gradient. In contrast to this, according to the second embodiment, since enhancement processing is performed with respect to a high-frequency component image, a normalized gradient can be accurately obtained from such a region. This allows extraction of a tumor with high precision. This applies to enhancement processing using other methods. The use of a high-frequency component improves the tumor shadow extraction precision.

As has been described above, according to the present invention, an isolated shadow such as a tumor shadow can be properly extracted.

In addition, according to the present invention, even if an isolated shadow such as a tumor shadow overlaps a vomer shadow or is located at the periphery of the lung field, an isolated shadow can be reliably extracted.

Note that the present invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A diagnosis support apparatus which supports diagnosis by processing an image, comprising:

an enhancement unit configured to enhance a circular shadow existing in an image by enhancing a pixel value gradient of the circular shadow while suppressing an overall pixel value gradient of the image; and wherein the enhancement unit calculates a normalized gradient of each pixel of the image, and determines a pixel value of a predetermined pixel on the basis of a sum of inner products of normalized gradients of a plurality of surrounding pixels on a circumference at a predetermined distance from the predetermined pixel and unit vectors extending from the plurality of surrounding pixels to the predetermined pixel;

an extraction unit configured to extract an isolated shadow from the image enhanced by said enhancement unit by using a disk shaped morphological filter and a ring shaped morphological filter.

2. The apparatus according to claim 1, wherein said extraction unit acquires, as a first pixel value, a maximum pixel value from all pixels, of the respective pixels in the image, which are located within a first predetermined distance from the predetermined pixel, acquires, as a second pixel value, a maximum pixel value from pixels which are located at not less than a second predetermined distance and within a third predetermined distance from the predetermined pixel, and sets a difference between the first pixel value and the second pixel value as a value of the predetermined pixel.

3. The apparatus according to claim 1, further comprising a labeling unit configured to label a region, of the isolated shadow extracted by said extraction unit, which exhibits a pixel value not less than a predetermined pixel value.

4. The apparatus according to claim 1, wherein
the apparatus further comprises a generating unit configured to generate a high-frequency image by extracting a high-frequency component from the image, and said enhancement unit generates an enhanced image by enhancing a circular shadow existing in the high-frequency image.

5. A diagnosis support method which processes an image for diagnosis support, comprising:

an enhancement step of enhancing a circular shadow existing in an image by enhancing a pixel value gradient of the circular shadow while suppressing an overall pixel value gradient of the image; and an extraction step of extracting an isolated shadow from the image enhanced in the enhancement step by using a disk shaped morphological filter and a ring shaped morphological filter.

6. A computer-readable memory storing a control program for causing a computer to execute a method defined in claim 5.

* * * * *

UNITED STATES PATENT AND TRADEMARK OFFICE
CERTIFICATE OF CORRECTION

PATENT NO. : 7,400,778 B2
APPLICATION NO. : 10/830169
DATED : July 15, 2008
INVENTOR(S) : Hiroyuki Shinbata It is certified that error appears in the above-identified patent and that said Letters Patent is hereby corrected as shown below:

Claim 1, column 8, line 34, change "the image; and" to --the image, wherein the enhancement ...--; and Claim 1, column 8, line 42, insert --and-- insert ";".

Signed and Sealed this

Twenty-third Day of September, 2008

JON W. DUDAS
*Director of the United States Patent and Trademark Office*